(No Model.)
D. H. RICE.
DRIER.
No. 316,484.
2 Sheets—Sheet 1.
Patented Apr. 28, 1885.
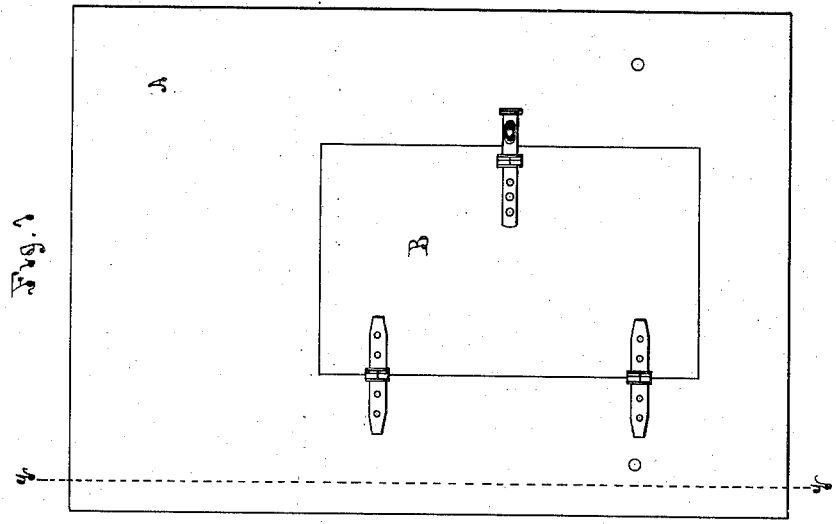
Witnesses
Inventor
David Hall Rice (No Model.) 2 Sheets—Sheet 2.
D. H. RICE.
DRIER.
No. 316,484. Patented Apr. 28, 1885.
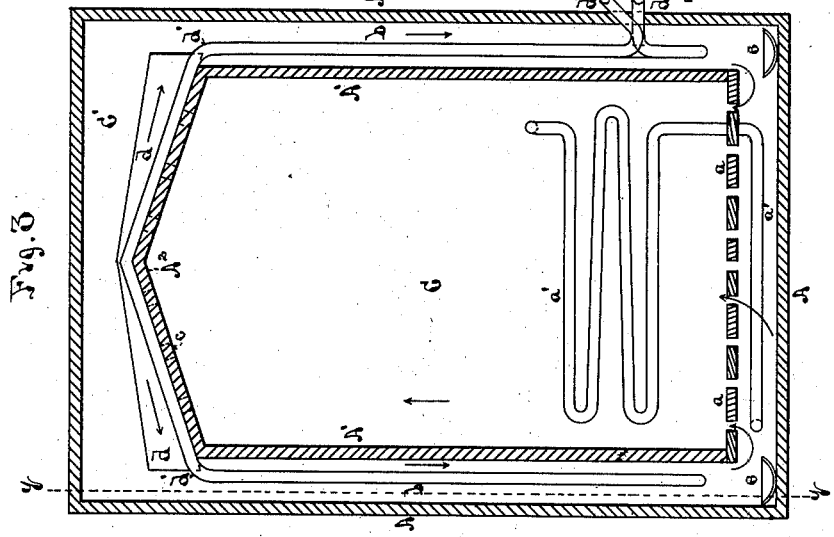
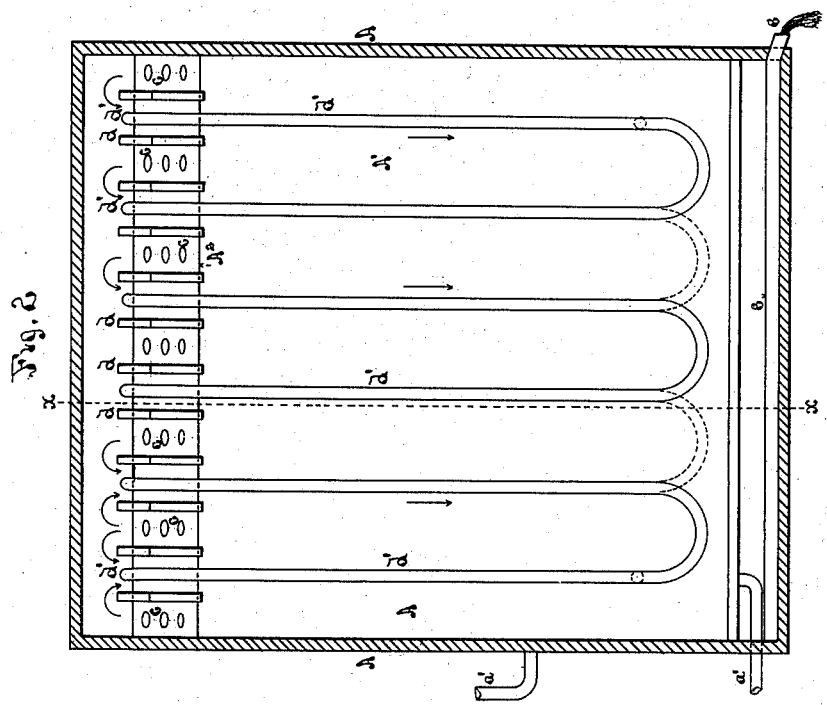
Witnesses
Wm S Brown
N. P. Ockington.
Inventor
David Hall Rice

UNITED STATES PATENT OFFICE.

DAVID HALL RICE, OF LOWELL, MASSACHUSETTS, ASSIGNOR TO THE ST. ALBANS MANUFACTURING COMPANY, OF ST. ALBANS, VERMONT.

DRIER.

SPECIFICATION forming part of Letters Patent No. 316,484, dated April 28, 1885.

Application filed May 10, 1884. (No model.)

*To all whom it may concern:*

Be it known that I, DAVID HALL RICE, of the city of Lowell, in the county of Middlesex and State of Massachusetts, have invented a new and useful Improvement in Driers, of which the following is a specification.

My invention relates to driers for the purpose of drying lumber and other substances, and is an improvement upon the device of E. Y. Robbins, patented July 19, 1864, No. 43,603.

It consists in the combination and arrangement of the several parts, substantially as hereinafter described and claimed.

In the drawings, Figure 1 is a front elevation of the drier. Fig. 2 is a sectional view through the line $y\,y$ of Figs. 1 and 3. Fig. 3 is a section through the line $x\,x$ of Fig. 2.

A is the outer casing of the drier, which is a box or room in the shape of a parallelogram. It is provided at the front end with a door, B, for the introduction and removal of the lumber to be dried, as shown in Fig. 1.

Within the outer casing, A, on each side of the door and extending from the front to the rear outer wall, are two vertical partitions, $A'\,A'$, which are so made as to leave spaces between their lower edges and the bottom outside casing, A, and also to leave spaces above their upper edges and between them and the outer casing.

Connected to the upper edges of the partitions $A'\,A'$ is a partition, $A^2$, extending from the front to the rear side of the drier, and of the shape of a gable roof, as shown.

The space C, between the front and rear ends of the drier, the partitions $A'\,A'$, and beneath the partition $A^2$, constitutes the drying-chamber, while the space $C'$, above the partition $A^2$, serves as a condensing-chamber. The drying-chamber C is provided with a slatted floor, $a$, on a level with the lower edges of the partitions $A'\,A'$, and is heated by a steam-pipe, $a'$, leading through the outer casing. Above and upon the top of the partition $A^2$, in the chamber $C'$, are fixed vertical partitions $d\,d$, parallel to each other and to the ends of the outer casing, so as to form troughs opening at the ends over the vertical spaces $b\,b$ between the partitions $A'\,A'$ and the outer casing.

Through the wall or partition $A^2$ in every other one of these troughs are made holes $c\,c$, to allow the heated air laden with moisture to rise from the chamber C into the chamber $C'$. Through the troughs between those so perforated in the bottom with the holes $c$ is placed the cold-water pipe $d'$, which leads from outside the casing of the machine upward and downward through the troughs and into the spaces $b\,b$ on each side of the drying-chamber C.

The function of the partitions $d$ is to prevent the air, which is cooled and condensed by coming in contact with the cold-water pipe $d'$, from flowing over or upon the holes $c\,c$, and thus checking or preventing the continual rising of the warm air from the drying-chamber, and also to prevent such dry and condensed air from commingling with the moist and heated air in the condensing-chamber, which is absolutely essential to a rapid automatic circulation of the air, and consequent drying of the lumber.

Directly below the vertical space $b\,b$ are placed troughs $e\,e$, which discharge outside the outer casing and serve to receive and carry off the water condensed out of the heated air by the pipe $d'$.

The steam-pipe $a'$ extends in part under the slatted floor $a$ and may be placed altogether under said floor, but in that case the floor should be raised up to allow the steam-pipe to be placed above the level of the lower edges of the partitions $A'\,A'$, as otherwise the heated air might rise into the spaces $b\,b$, instead of through the drying-chamber alone, as is now the case, only enough of the steam-pipe being below the floor to slightly warm the air immediately beneath the drying-chamber and induce it to commence to rise.

The operation of the drier is as follows: The air being heated in the chamber C, and taking up moisture from the lumber, rises through the holes $c\,c$ into the chamber $C'$ between the partitions $d$. As it continues to rise, it will flow over the edges of the partitions, as indicated by the arrows, and, coming into contact with the cold-water pipe $d'$, be cooled and have the moisture condensed out of it and flow along down the trough containing the pipe between the partitions $d$ and into the spaces $e\ e$. The partitions $d$ thus prevent the mingling of the cooled and dried with the warm and moist air in the same compartment, while allowing ample access of the warm air to the cold-water pipe. The wall $A^2$, being formed sloping each way from the center, assists the air as it becomes cooled by the pipe $d'$ to flow downward into the spaces $b\ b$, and the partitions $d\ d$, being nearly level on top, contain more of the cooled air between them as they approach the spaces $b\ b$ in order to force it into the latter.

When the air falls into the spaces $b\ b$, it continues to be cooled and pass downward to the spaces under the partitions $A'\ A'$, through which it flows under the perforated floor $a$, in a cool and dry state, ready to rise into the chamber C and be heated and take up fresh moisture from the lumber. All moisture condensed from the air will obviously flow downward into the troughs $e\ e$ and be conducted out of the drier.

The advantages of my improvement are that it exposes a very large condensing-surface to the warm, moist air at once in the condensing-chamber and prevents any condensation from checking the circulation, and affords ample means of conducting the condensed air downward as fast as it is cooled. The position of the steam-radiator above the lower edges of the partitions $A'\ A'$ also tends to insure the rising of the warm air in the chamber C only.

Instead of having the holes $c\ c$ on a level with the bottoms of the partitions $d\ d$, the part of the wall $C^2$ in which they are contained may be raised to the level of the top of said partitions, if desired, as the fundamental principle of the structure is to have the cold-water condensing-pipe $d'$ located in one or more depressions in the condensing-chamber $C'$ below the place or places where the warm and moist air enters said chamber, which depression opens or leads into a downward conduit, $e$, for the escape of the cooled and condensed air below the level of the point where the warm air flows in.

What I claim as new and of my invention is—

1. The combination of the drying-chamber C, the condensing-chamber $C'$, above the same and connected thereto by one or more hot-air passages, $c$, and the condensing-pipe $d'$, separated therefrom by a partition or partitions, $d\ d$, in the chamber $C'$ and adapted to conduct the condensed air into one or more downward air-passages, $b$, substantially as described.

2. The combination of the chamber C, the chamber $C'$, one or more air-passages, $b$, the perforated dividing-wall $A^2$, inclined downward toward the latter, and the partitions $d\ d$ and condensing-pipe $d'$, substantially as described.

DAVID HALL RICE.

Witnesses:
WILLIAM P. BLAKE,
N. P. OCKINGTON.